United States Patent
Komachi et al.

(10) Patent No.: US 10,396,435 B2
(45) Date of Patent: Aug. 27, 2019

(54) ANTENNA DEVICE AND PORTABLE WIRELESS DEVICE USING THE SAME

(71) Applicant: TDK Corporation, Tokyo (JP)

(72) Inventors: Toshifumi Komachi, Tokyo (JP); Toshio Tomonari, Tokyo (JP); Hirohumi Asou, Tokyo (JP)

(73) Assignee: TDK CORPORATION, Tokyo (JP)

( * ) Notice: Subject to any disclaimer, the term of this patent is extended or adjusted under 35 U.S.C. 154(b) by 158 days.

(21) Appl. No.: 15/595,555

(22) Filed: May 15, 2017

(65) Prior Publication Data

US 2017/0338547 A1 Nov. 23, 2017

(30) Foreign Application Priority Data

May 23, 2016 (JP) .................................. 2016-102044

(51) Int. Cl.
| | |
|---|---|
| *H01Q 1/24* | (2006.01) |
| *H01Q 7/00* | (2006.01) |
| *H01Q 9/04* | (2006.01) |
| *H04B 5/00* | (2006.01) |

(52) U.S. Cl.
CPC .............. *H01Q 1/243* (2013.01); *H01Q 7/00* (2013.01); *H01Q 9/0407* (2013.01); *H04B 5/00* (2013.01)

(58) Field of Classification Search
CPC ........ H01Q 1/243; H01Q 7/00; H01Q 9/0407; H04B 5/00
USPC ........................................................ 343/702
See application file for complete search history.

(56) References Cited

U.S. PATENT DOCUMENTS

| | | | | |
|---|---|---|---|---|
| 6,452,563 | B1 * | 9/2002 | Porte ........................ | H01Q 7/00 343/742 |
| 7,050,007 | B2 * | 5/2006 | Akiho .................. | G06K 7/0008 343/702 |
| 7,088,304 | B2 * | 8/2006 | Endo .................. | G06K 19/0726 343/788 |
| 8,354,971 | B2 * | 1/2013 | Ito .................... | G06K 19/07749 343/787 |
| 9,490,537 | B2 * | 11/2016 | Ito ............................ | H01Q 7/06 |
| 9,859,610 | B2 * | 1/2018 | Ito ............................ | H01Q 7/06 |
| 2004/0074974 | A1 * | 4/2004 | Senba ................. | G06K 7/10336 235/492 |
| 2012/0098711 | A1 * | 4/2012 | Yosui .................. | G06K 7/10336 343/702 |
| 2012/0208606 | A1 * | 8/2012 | Kubo ............... | G06K 19/07779 455/575.7 |
| 2014/0218261 | A1 | 8/2014 | Ito | |

FOREIGN PATENT DOCUMENTS

| | | |
|---|---|---|
| CN | 104681990 A | 6/2015 |
| JP | 5673854 A1 | 4/2015 |

* cited by examiner

*Primary Examiner* — Huedung X Mancuso
(74) *Attorney, Agent, or Firm* — Young Law Firm, P.C.

(57) ABSTRACT

Disclosed herein is an antenna device that includes a planar coil pattern having first, second, third and fourth sections, the first and second sections being opposite to each other, and the third and fourth sections being opposite to each other, and a metal layer having at least one aperture. A part of the first section and a part of the second section overlap the metal layer, and a remaining part of the first section and a remaining part of the second section overlap the aperture. A part or an entirety of both the third and fourth sections overlaps the metal layer or the aperture.

14 Claims, 7 Drawing Sheets

ANTENNA DEVICE AND PORTABLE WIRELESS DEVICE USING THE SAME

BACKGROUND OF THE INVENTION

Field of the Invention

The present invention relates to an antenna device and a portable wireless device provided with the antenna device and, more particularly, to an antenna device suitable for NFC (Near Field Communication) and a portable wireless device provided with the antenna device.

Description of Related Art

In recent years, an RFID (Radio Frequency Identification) system is implemented in a portable wireless device such as a smartphone, and such a portable wireless device is provided with an antenna device for performing near field communication with a reader/writer as a communication means. An antenna device of such a type is described in Japanese Patent No. 5,673,854, for example.

The antenna device described in Japanese Patent No. 5,673,854 is provided with a planar coil pattern and a metal layer covering the planar coil pattern, wherein an inner diameter region of the planar coil pattern overlaps an opening part of the metal layer.

However, in the antenna device described in Japanese Patent No. 5,673,854, the planar coil pattern is offset with respect to the aperture, so that if the planar coil pattern and the aperture are two-dimensionally displaced from each other at manufacturing, the overlapping area between the inner diameter region of the planar coil pattern and the aperture may be varied to change antenna characteristics significantly.

SUMMARY

It is therefore an object of the present invention to provide an antenna device capable of suppressing a change in antenna characteristics even if the planar coil pattern and the aperture are two-dimensionally displaced from each other and a portable wireless device provided with the antenna device.

An antenna device according to the present invention includes a planar coil pattern having first, second, third and fourth sections, the first and second sections being opposite to each other, and the third and fourth sections being opposite to each other, and a metal layer having at least one aperture, wherein a part of the first section and a part of the second section overlap the metal layer, and a remaining part of the first section and a remaining part of the second section overlap the aperture, and wherein apart or an entirety of both the third and fourth sections overlaps the metal layer or the aperture.

A portable wireless device according to the present invention is provided with the above antenna device.

According to the present invention, even if the planar coil pattern and the aperture are two-dimensionally displaced from each other, the overlapping amount between the inner diameter region of the planar coil pattern and the aperture is hardly varied, so that a change in antenna characteristics can be suppressed.

In the present invention, the aperture may include a first aperture that partially overlaps both the first and second sections. In this case, both the third and fourth sections may entirely overlap the metal layer. This configuration is adopted suitably when one aperture is formed in the metal layer.

In the present invention, the aperture may include a second aperture that overlaps at least the first and third sections and a third aperture that overlaps at least the second and fourth sections. In this case, the third section may entirely overlap the second aperture, and the fourth section may entirely overlap the third aperture. This configuration is adopted suitably when two or more apertures are formed in the metal layer.

As described above, according to the present invention, it is possible to suppress a change in antenna characteristics even if the planar coil pattern and the aperture are two-dimensionally displaced from each other.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

First Embodiment

Figure 1:
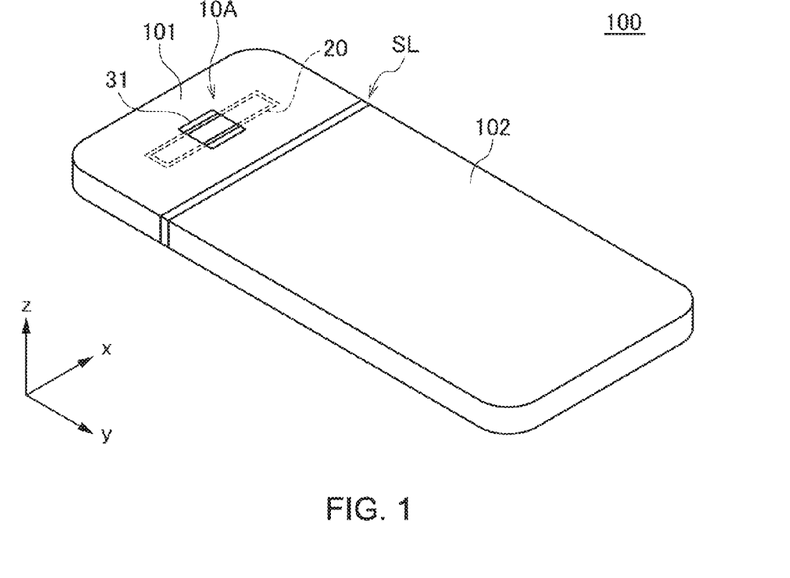
FIG. 1 is a schematic perspective view illustrating the configuration of a portable wireless device provided with an antenna device according to a first embodiment of the present invention.

FIG. 1 is a schematic perspective view illustrating the configuration of a portable wireless device 100 provided with an antenna device 10A according to the first embodiment of the present invention.

The portable wireless device 100 illustrated in FIG. 1 is, e.g., a smartphone and has a thin box-like casing. FIG. 1 is a view illustrating the portable wireless device 100 as viewed from its back surface side. Thus, the front surface of the casing on which a display and the like are provided faces downward. The casing of the portable wireless device 100 is formed of a combination of resin and metal. An area constituting a large part of the back surface is formed of a metal layer 102. A metal layer 101 is formed at one side of the casing in the longitudinal direction (y-direction) that is located opposite the side at which the metal layer 102 is formed.

The metal layers 101 and 102 constitute the same xy plane and face each other through a slit SL. The slit SL extends in the x-direction on the back surface of the casing and extends in the z-direction on the side surfaces of the casing. The reason that the wide area of the casing back surface is formed of the metal layers 101 and 102 is mainly for improving the mechanical strength, magnetic shielding characteristics and design of the casing.

An aperture 31 having a rectangular outer periphery is formed in the metal layer 101. The aperture 31 is a part where a camera lens, a camera flash, a fingerprint authentication device, and the like are disposed and is formed by hollowing out the metal layer 101. The outer periphery of the aperture 31 is closed, and thus the outer periphery of the aperture 31 and the outer periphery of the metal layer 101 are not connected. In the present embodiment, the outer periphery of the aperture 31 constitutes a rectangle extending in the x-direction and y-direction.

The portable wireless device 100 incorporates a spiral-shaped planar coil pattern 20. The planar coil pattern 20 is covered with the metal layer 101 and is disposed such that a part thereof overlaps the aperture 31. When a camera lens, a camera flash, a fingerprint authentication device, and the like are disposed in the aperture 31, the planar coil pattern 20 is covered with them, so that the planar coil pattern 20 actually cannot be seen from outside.

The planar coil pattern 20 and the metal layer 101 that covers the planar coil pattern 20 constitute the antenna device 10A according to the present embodiment. The planar coil pattern 20 is connected to an unillustrated RF circuit incorporated in the portable wireless device 100. Thus, the antenna device 10A according to the present embodiment can be used for, e.g., 13.56 MHz NFC.

Figure 2:
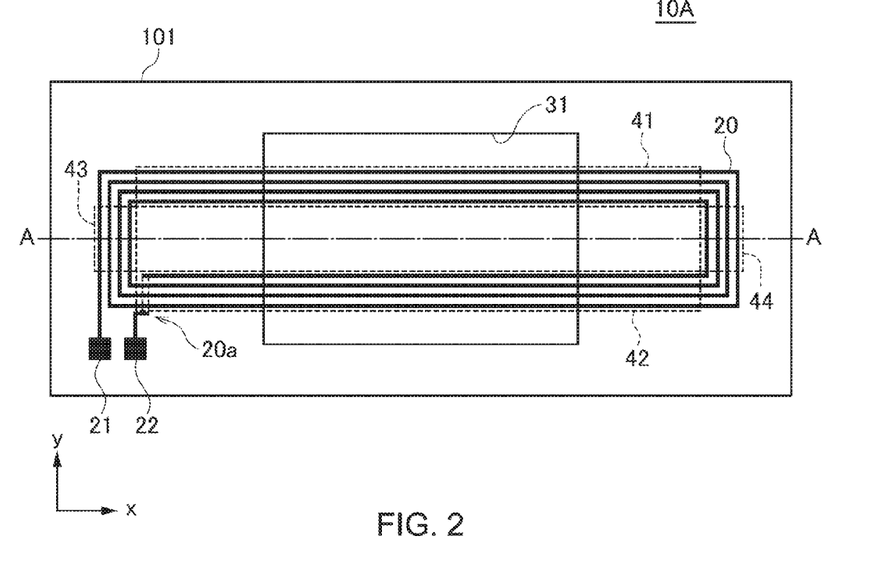
FIG. 2 is a plan view transparently illustrating the configuration of the antenna device according to the first embodiment of the present invention.
Figure 3:
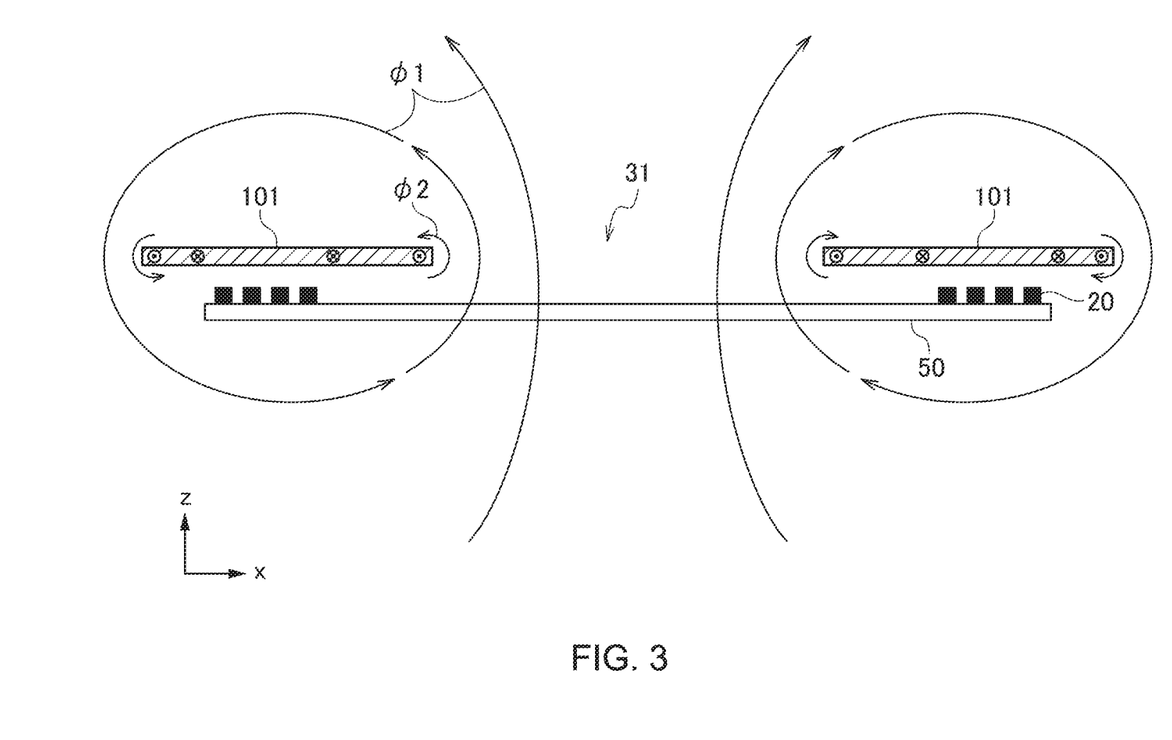
FIG. 3 is a cross-sectional view taken along line A-A of FIG. 2.

FIG. 2 is a plan view transparently illustrating the configuration of the antenna device 10A. FIG. 3 is a cross-sectional view taken along line A-A of FIG. 2.

In the present embodiment, the planar coil pattern 20 is formed into a rectangular planar shape elongated in the x-direction, and the number of turns thereof is, e.g., four. Thus, a conductor pattern constituting the planar coil pattern 20 has first and second sections 41 and 42 extending in the x-direction and third and fourth sections 43 and 44 extending in the y-direction, and the former are longer than the latter. Terminals 21 and 22 illustrated in FIG. 2 are terminals connected to an unillustrated RF circuit. The terminal 21 is connected to the outer peripheral end of the planar coil pattern 20, and the terminal 22 is connected to the inner peripheral end of the planar coil pattern 20 through a crossing part 20a that crosses the conductor pattern. As illustrated in FIG. 3, the planar coil pattern 20 is formed on a single substrate 50 made of PET resin, and the crossing part 20a that crosses the conductor pattern is formed on, e.g., the back surface of the substrate 50.

As illustrated in FIG. 2, the aperture 31 formed in the metal layer 101 has a shape in which the width thereof in the x-direction is shorter than the length of the planar coil pattern 20 in the x-direction, and the width thereof in the y-direction is longer than the length of the planar coil pattern 20 in the y-direction. The aperture 31 is disposed at the position overlapping substantially the center portion of the first section 41 of the planar coil pattern 20 and substantially the center portion of the second section 42. As a result, a part of the inner diameter region of the planar coil pattern 20 is not covered with the metal layer 101 but is exposed to the aperture 31. In both the first and second sections 41 and 42 of the planar coil pattern 20, apart thereof overlaps the metal layer 101 and the remaining part overlaps the aperture 31. Further, both the third and fourth sections 43 and 44 of the planar coil pattern 20 entirely overlap the metal layer 101.

Figure 4:
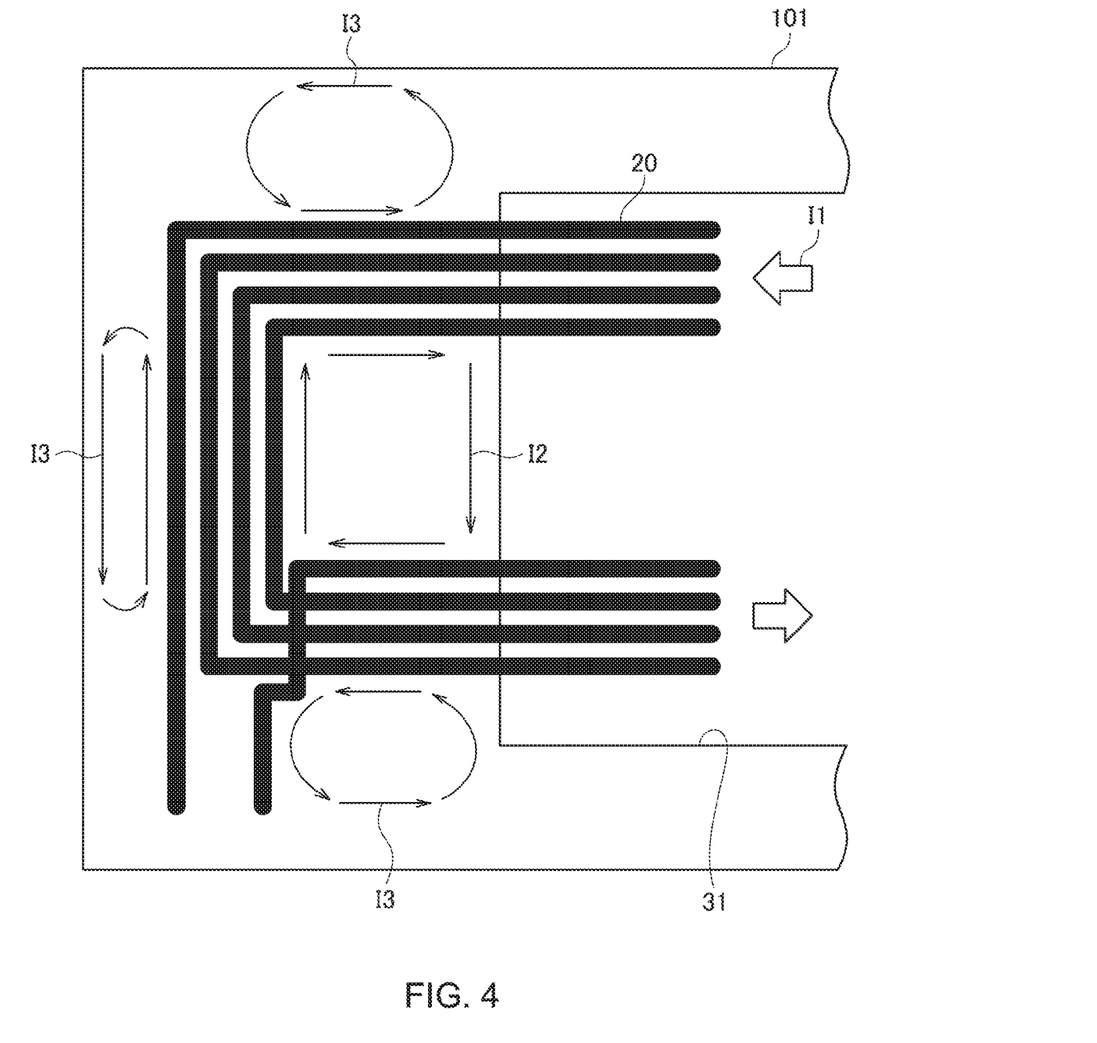
FIG. 4 is a partially enlarged view of the antenna device according to the first embodiment of the present invention, which explains a function obtained when current is made to flow in the planar coil pattern.

FIG. 4 is a partially enlarged view of the antenna device 10A, which explains a function obtained when current is made to flow in the planar coil pattern 20.

As illustrated in FIG. 4, when a counterclockwise (left-handed) current I1 is made to flow in the planar coil pattern 20, a magnetic flux $\phi 1$ (see FIG. 3) generated at this time is radiated outside from a part of the inner diameter region of the planar coil pattern 20 that is not covered with the metal layer 101, that is, a part of the inner diameter region of the planar coil pattern 20 that overlaps the aperture 31 and circulates widely around the metal layer 101. As a result, the magnetic flux $\phi 1$ is radiated outside without being shielded by the metal layer 101, and a range of the magnetic flux $\phi 1$ is widened by the circulation, which can increase communication distance and widen antenna directivity.

On the other hand, current flows in the metal layer 101 in a direction canceling the magnetic flux $\phi 1$. Specifically, a current I2 illustrated in FIG. 4 flows in the inner diameter region surrounded by the planar coil pattern 20, and a current I3 illustrated in FIG. 4 flows in a region outside the planar coil pattern 20. The current I2 generates a magnetic flux $\phi 2$ (see FIG. 3) in the same direction as the magnetic flux $\phi 1$ passing through the aperture 31 and thus serves an accelerator, thereby further increasing communication distance.

In the present embodiment, the aperture 31 is formed so as to cross, in the y-direction, the substantially center portion of the planar coil pattern 20 in the x-direction. Thus, even if the planar coil pattern 20 and the aperture 31 are two-dimensionally displaced (in the xy plane) from each other, the overlapping amount between the inner diameter region of the planar coil pattern 20 and the aperture 31 is hardly varied, so that a change in antenna characteristics can be suppressed. Thus, when the antenna device 10A according to the present embodiment is used as an antenna for NFC, variations in communication distance due to manufacturing irregularity can be reduced.

Second Embodiment

Figure 5:
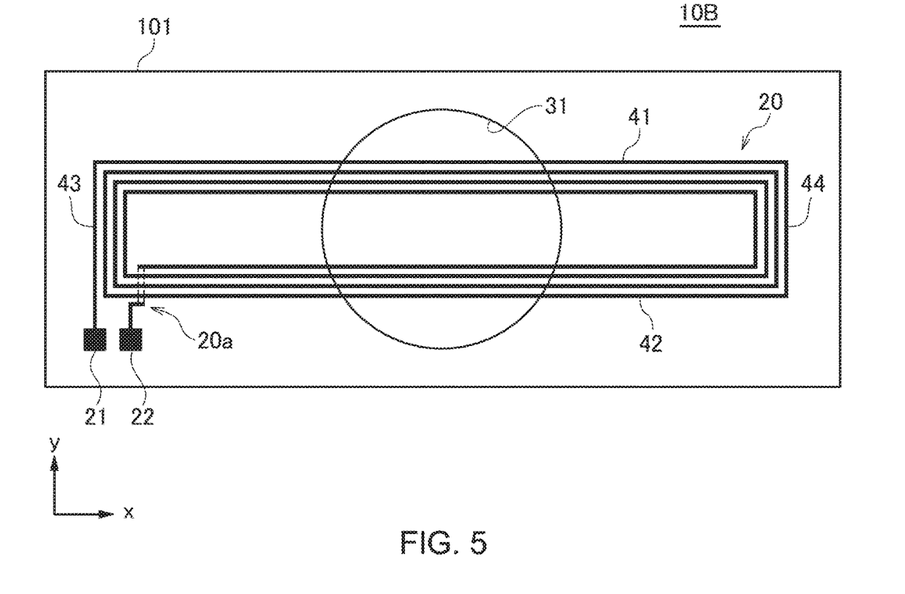
FIG. 5 is a plan view transparently illustrating the configuration of an antenna device according to a second embodiment of the present invention.

FIG. 5 is a plan view transparently illustrating the configuration of an antenna device 10B according to the second embodiment of the present invention.

The antenna device 10B according to the second embodiment differs from the antenna device 10A according to the first embodiment in that the aperture 31 has a circular planar shape. Other configurations are basically the same as those of the antenna device 10A according to the first embodiment. Thus, the same reference numerals are given to the same elements, and overlapping description will be omitted. If the planar coil pattern 20 and the aperture 31 are displaced from each other in the y-direction in the configuration in which the aperture 31 has the circular outer periphery, the overlapping amount between the inner diameter region of the planar coil pattern 20 and the aperture 31 is only slightly varied, and, hence, it is possible to obtain a similar effect as that in the antenna device 10A according to the first embodiment.

Third Embodiment

Figure 6:
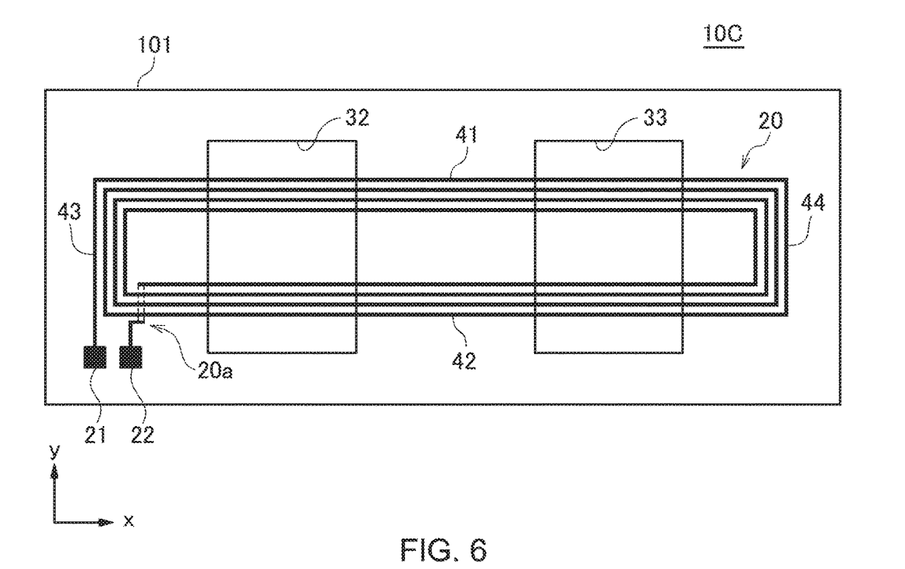
FIG. 6 is a plan view transparently illustrating the configuration of an antenna device according to a third embodiment of the present invention.

FIG. 6 is a plan view transparently illustrating the configuration of an antenna device 10C according to the third embodiment of the present invention.

The antenna device 10C according to the third embodiment is basically the same as the antenna device 10A according to the first embodiment except that it has two apertures 32 and 33. Thus, the same reference numerals are given to the same elements, and overlapping description will be omitted.

The apertures 32 and 33 each have a shape in which the width thereof in the x-direction is shorter than the length of the planar coil pattern 20 in the x-direction, and the width thereof in the y-direction is longer than the length of the planar coil pattern 20 in the y-direction. The apertures 32 and 33 are disposed at the positions overlapping the respective center-left portion and center-right portion of the first and second sections 41 and 42 of the planar coil pattern 20. As a result, in both the first and second sections 41 and 42 of the planar coil pattern 20, a part thereof overlaps the metal layer 101 and the remaining part overlaps the apertures 32 and 33. Further, both the third and fourth sections 43 and 44 of the planar coil pattern 20 entirely overlap the metal layer 101.

Even in such a configuration, a variation in the overlapping amount between the inner diameter region of the planar coil pattern 20 and the apertures 32 and 33 that is ascribable to the two-dimensional displacement hardly takes place. Thus, it is possible to obtain the same effect as that of the antenna device 10A according to the first embodiment. The present embodiment is adopted suitably when two apertures are required for implementing a camera lens, a camera flash, a fingerprint authentication device, and the like, and they are disposed close to each other in the x-direction.

Fourth Embodiment

Figure 7:
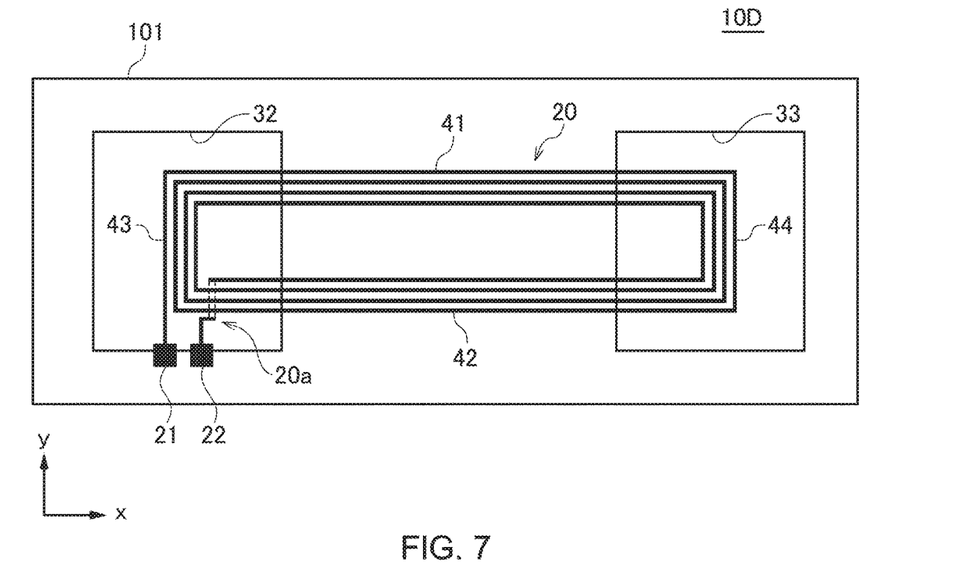
FIG. 7 is a plan view transparently illustrating the configuration of an antenna device according to a fourth embodiment of the present invention.

FIG. 7 is a plan view transparently illustrating the configuration of an antenna device 10D according to the fourth embodiment of the present invention.

The antenna device 10D according to the fourth embodiment differs from the antenna device 10C according to the third embodiment in positions of the apertures 32 and 33. Other configurations are basically the same as those of the antenna device 10C according to the third embodiment. Thus, the same reference numerals are given to the same elements, and overlapping description will be omitted.

In the present embodiment, the aperture 32 is formed so as to overlap the third section 43 of the planar coil pattern 20, and the aperture 33 is formed so as to overlap the fourth section 44 of the planar coil pattern 20. As a result, in both the first and second sections 41 and 42 of the planar coil pattern 20, a part thereof overlaps the metal layer 101 and the remaining part overlaps the apertures 32 and 33. Further, the third and fourth sections 43 and 44 of the planar coil pattern 20 entirely overlap the apertures 32 and 33, respectively.

In such a configuration, if a displacement occurs in the x-direction, the overlapping amount between the inner diameter region of the planar coil pattern 20 and the apertures 32 and 33 is varied; but this variation is complementary. That is, when the overlapping amount between the inner diameter region of the planar coil pattern 20 and the aperture 32 is reduced by the x-direction displacement, the overlapping amount between the inner diameter region of the planar coil pattern 20 and the aperture 33 is increased, and vice versa. Thus, a variation in the entire overlapping amount between the inner diameter region of the planar coil pattern 20 and the apertures 32 and 33 that is ascribable to the two-dimensional displacement hardly takes place. Thus, it is possible to obtain the same effect as that of the antenna device 10C according to the third embodiment. The present embodiment is adopted suitably when two apertures are required for implementing a camera lens, a camera flash, a fingerprint authentication device, and the like, and they are distanced from each other in the x-direction.

Fifth Embodiment

Figure 8:
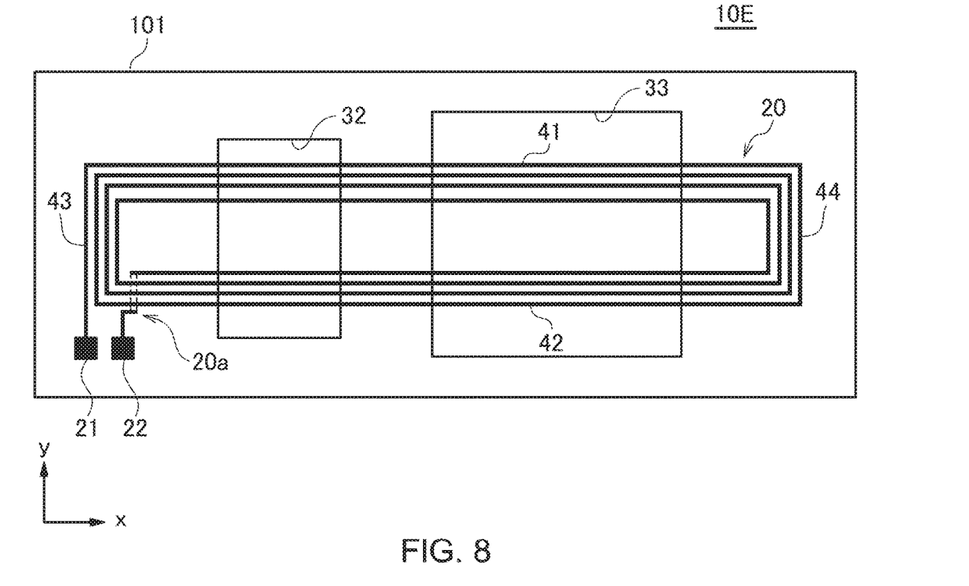
FIG. 8 is a plan view transparently illustrating the configuration of an antenna device according to a fifth embodiment of the present invention.

FIG. 8 is a plan view transparently illustrating the configuration of an antenna device 10E according to the fifth embodiment of the present invention.

The antenna device 10E according to the fifth embodiment differs from the antenna device 10C according to the third embodiment in that the apertures 32 and 33 are different in size from each other. Other configurations are basically the same as those of the antenna device 10C according to the third embodiment. Thus, the same reference numerals are given to the same elements, and overlapping description will be omitted. Even when the apertures 32 and 33 are different in size from each other, it is possible to obtain the same effect as that of the antenna device 10C according to the third embodiment. The present embodiment is adopted suitably when two apertures are required for implementing a camera lens, a camera flash, a fingerprint authentication device, and the like, and they are different in size from each other.

Sixth Embodiment

Figure 9:
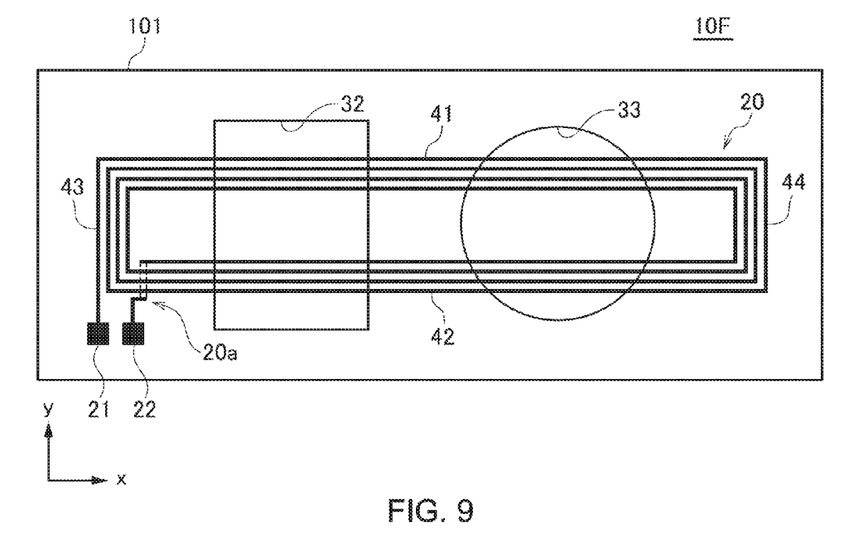
FIG. 9 is a plan view transparently illustrating the configuration of an antenna device according to a sixth embodiment of the present invention.

FIG. 9 is a plan view transparently illustrating the configuration of an antenna device 10F according to the sixth embodiment of the present invention.

The antenna device 10F according to the sixth embodiment differs from the antenna device 10C according to the third embodiment in that the apertures 32 and 33 are different in shape from each other. Other configurations are basically the same as those of the antenna device 10C according to the third embodiment. Thus, the same reference numerals are given to the same elements, and overlapping description will be omitted. In the example of FIG. 9, the aperture 32 has a rectangular planar shape, and the aperture 33 has a circular planar shape. Even when the apertures 32 and 33 are different in shape from each other, it is possible to obtain a similar effect as that of the antenna device 10C according to the third embodiment. The present embodiment is adopted suitably when two apertures are required for implementing a camera lens, a camera flash, a fingerprint authentication device, and the like, and they are different in shape from each other.

Seventh Embodiment

Figure 10:
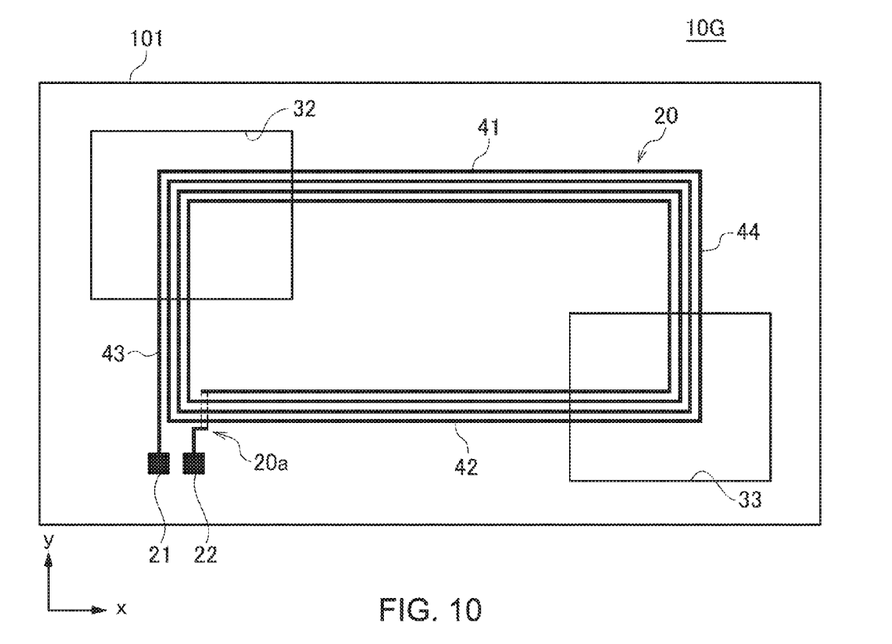
FIG. 10 is a plan view transparently illustrating the configuration of an antenna device according to a seventh embodiment of the present invention.

FIG. 10 is a plan view transparently illustrating the configuration of an antenna device 10G according to the seventh embodiment of the present invention.

The antenna device 10G according to the seventh embodiment differs from the antenna device 10D according to the fourth embodiment in that the positions of the apertures 32 and 33 in the y-direction are different. Other configurations are basically the same as those of the antenna device 10D according to the fourth embodiment. Thus, the same reference numerals are given to the same elements, and overlapping description will be omitted.

In the present embodiment, the aperture 32 is formed at the corner portion that overlaps the first and third sections 41 and 43 of the planar coil pattern 20, and the aperture 33 is formed at the corner portion that overlaps the second and fourth sections 42 and 44 of the planar coil pattern 20. As a result, in both the first and second sections 41 and 42 of the planar coil pattern 20, a part thereof overlaps the metal layer 101 and the remaining part overlaps the apertures 32 and 33, respectively. Further, in both the third and fourth sections 43 and 44 of the planar coil pattern 20, a part thereof overlaps the metal layer 101 and the remaining part overlaps the apertures 32 and 33, respectively.

In such a configuration, if a two-dimensional displacement occurs, the overlapping amount between the inner diameter region of the planar coil pattern 20 and the apertures 32 and 33 is varied; but this variation is complementary. That is, when the overlapping amount between the inner diameter region of the planar coil pattern 20 and the aperture 32 is reduced because of the x-direction or y-direction displacement, the overlapping amount between the inner diameter region of the planar coil pattern 20 and the aperture 33 is increased, and vice versa. Thus, a variation in the entire overlapping amount between the inner diameter region of the planar coil pattern 20 and the apertures 32 and 33 that is ascribable to the two-dimensional displacement hardly takes place. Thus, it is possible to obtain the same effect as that of the antenna device 10D according to the fourth embodiment. The present embodiment is adopted suitably when two apertures are required for implementing a camera lens, a camera flash, a fingerprint authentication device, and the like, and they are formed at different positions in the y-direction.

Eighth Embodiment

Figure 11:
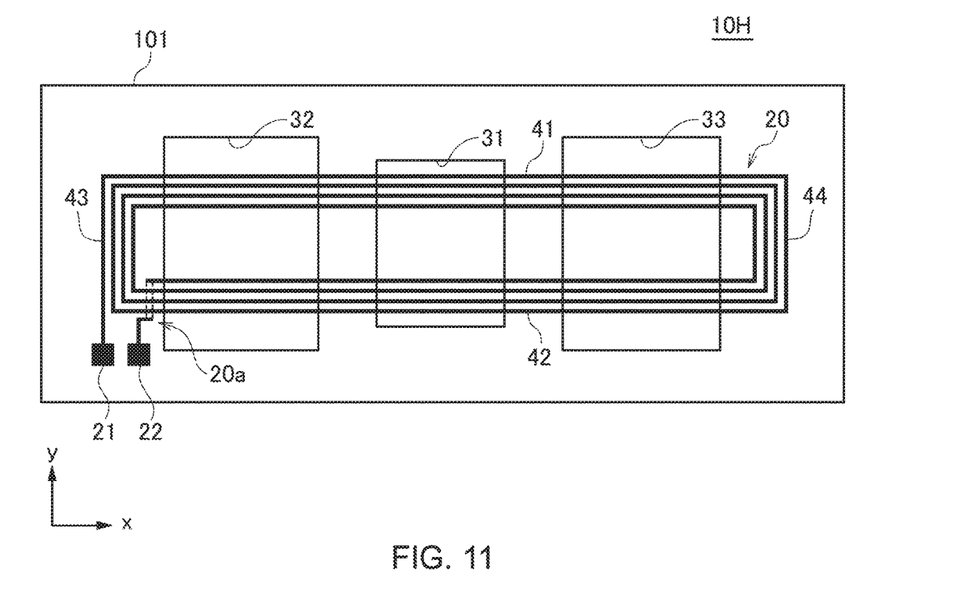
FIG. 11 is a plan view transparently illustrating a configuration of an antenna device according to an eighth embodiment of the present invention.

FIG. 11 is a plan view transparently illustrating a configuration of an antenna device 10H according to the eighth embodiment of the present invention.

The antenna device 10H according to the eighth embodiment is basically the same as the antenna devices 10A and 10C according to the respective first and third embodiments except that it has three apertures 31 to 33. Thus, the same reference numerals are given to the same elements, and overlapping description will be omitted.

In the present embodiment, the apertures 31 to 33 are each formed so as to overlap the first and second sections 41 and 42 of the planar coil pattern 20, and the third and fourth sections 43 and 44 of the planar coil pattern 20 are entirely covered with the metal layer 101.

Even in such a configuration, a variation in the entire overlapping amount between the inner diameter region of the planar coil pattern 20 and the apertures 31 to 33 that is ascribable to the two-dimensional displacement hardly takes place. Thus, it is possible to obtain the same effect as that of the antenna device 10A and 10C according to the respective first and third embodiments. The present embodiment is adopted suitably when three apertures are required for implementing a camera lens, a camera flash, a fingerprint authentication device, and the like, and they are disposed close to each other in the x-direction.

Ninth Embodiment

Figure 12:
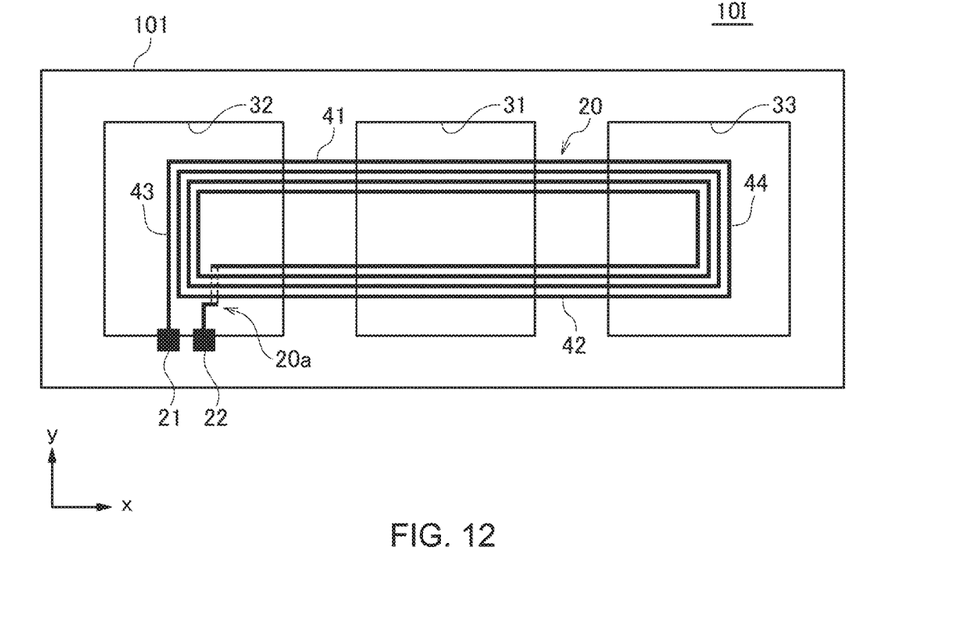
FIG. 12 is a plan view transparently illustrating the configuration of an antenna device according to a ninth embodiment of the present invention.

FIG. 12 is a plan view transparently illustrating the configuration of an antenna device 10I according to the ninth embodiment of the present invention.

The antenna device 10I according to the ninth embodiment is basically the same as the antenna devices 10A and 10D according to the respective first and fourth embodiments except that it has three apertures 31 to 33. Thus, the same reference numerals are given to the same elements, and overlapping description will be omitted.

In the present embodiment, the apertures 31 to 33 are each formed so as to overlap the first and second sections 41 and 42 of the planar coil pattern 20, and the third and fourth sections 43 and 44 of the planar coil pattern 20 entirely overlap the apertures 32 and 33, respectively.

Even in such a configuration, a variation in the entire overlapping amount between the inner diameter region of the planar coil pattern 20 and the apertures 31 to 33 that is ascribable to the two-dimensional displacement hardly takes place. Thus, it is possible to obtain the same effect as that of the antenna device 10A and 10D according to the respective first and fourth embodiments. The present embodiment is adopted suitably when three apertures are required for implementing a camera lens, a camera flash, a fingerprint authentication device, and the like, and they are slightly distanced from each other in the x-direction.

It is apparent that the present invention is not limited to the above embodiments, but may be modified and changed without departing from the scope and spirit of the invention.

For example, the shape of the planar coil pattern 20 is not limited to those described in the above-described embodiments, but may be a polygonal shape such as a hexagon or an octagon, or an elliptical shape. Further, the number of turns of the conductor pattern constituting the planar coil pattern 20 is not particularly limited.

What is claimed is:

1. An antenna device comprising:
    a planar coil pattern having first, second, third and fourth sections, the first and second sections being opposite to each other, and the third and fourth sections being opposite to each other; and
    a metal layer having at least one aperture,
    wherein a part of the first section and a part of the second section overlap the metal layer, and a remaining part of the first section and a remaining part of the second section overlap the aperture,
    wherein a part or an entirety of both the third and fourth sections overlaps the metal layer or the aperture, and
    wherein the aperture includes a first aperture that overlaps at least the first and third sections and a second aperture that overlaps at least the second and fourth sections.

2. The antenna device as claimed in claim 1, wherein the aperture further includes a third aperture that partially overlaps both the first and second sections.

3. The antenna device as claimed in claim 1, wherein the third section entirely overlaps the first aperture, and the fourth section entirely overlaps the second aperture.

4. A portable wireless device having an antenna device, the antenna device comprising:
    a planar coil pattern having first, second, third and fourth sections, the first and second sections being opposite to each other, and the third and fourth sections being opposite to each other; and a metal layer having at least one aperture,
wherein a part of the first section and a part of the second section overlap the metal layer, and a remaining part of the first section and a remaining part of the second section overlap the aperture,
wherein a part or an entirety of both the third and fourth sections overlaps the metal layer or the aperture, and
wherein the aperture includes a first aperture that overlaps at least the first and third sections and a second aperture that overlaps at least the second and fourth sections.

5. The portable wireless device as claimed in claim 4, wherein the metal layer is a part of a casing of the portable wireless device.

6. The portable wireless device as claimed in claim 4, wherein the aperture further includes a third aperture that partially overlaps both the first and second sections.

7. The portable wireless device as claimed in claim 4, wherein the third section entirely overlaps the first aperture, and the fourth section entirely overlaps the second aperture.

8. An antenna device comprising:
a coil pattern surrounding an inner diameter region, the coil pattern having first and second sections extending in a first direction and third and fourth sections extending in a second direction crossing the first direction, the inner diameter region being sandwiched between the first and second sections in the second direction and being sandwiched between the third and fourth sections in the first direction, each of the first and second sections being longer than each of the third and fourth sections; and
a metal layer covering the coil pattern, the metal layer having a first aperture that overlaps a part of the first section, a part of the second section, and a part of the inner diameter region without overlapping the third section.

9. The antenna device as claimed in claim 8, wherein the metal layer covers the third and fourth sections.

10. The antenna device as claimed in claim 9, wherein the metal layer further has a second aperture that overlaps another part of the first section, another part of the second section, and another part of the inner diameter region.

11. The antenna device as claimed in claim 10, wherein the first and second apertures are different in size from each other.

12. The antenna device as claimed in claim 10, wherein the first and second apertures are different in shape from each other.

13. The antenna device as claimed in claim 9, wherein the first aperture further overlaps the fourth section.

14. The antenna device as claimed in claim 13, wherein the metal layer further has a second aperture that overlaps another part of the first section, another part of the second section, the third section, and another part of the inner diameter region.

* * * * *